United States Patent
Merle et al.

(10) Patent No.: US 8,653,424 B2
(45) Date of Patent: Feb. 18, 2014

(54) COMPENSATION FOR INDUCTION HEATING IN COIL WELDING EQUIPMENT

(75) Inventors: Bernd Merle, Alsfeld (DE); Stefan Kehm, Gedern-Wenings (DE); Achim Spychalski-Merle, Alsfeld (DE)

(73) Assignee: PF-Schweisstechnologie GmbH, Alsfeld (DE)

( * ) Notice: Subject to any disclaimer, the term of this patent is extended or adjusted under 35 U.S.C. 154(b) by 1607 days.

(21) Appl. No.: 10/569,849

(22) PCT Filed: Aug. 26, 2004

(86) PCT No.: PCT/EP2004/009548
§ 371 (c)(1),
(2), (4) Date: Apr. 17, 2007

(87) PCT Pub. No.: WO2005/023522
PCT Pub. Date: Mar. 17, 2005

(65) Prior Publication Data
US 2007/0215600 A1   Sep. 20, 2007

(30) Foreign Application Priority Data
Sep. 1, 2003 (DE) .................................. 103 40 206

(51) Int. Cl.
*H05B 1/02* (2006.01)
(52) U.S. Cl.
USPC ............ 219/497; 219/492; 219/505; 219/535
(58) Field of Classification Search
USPC .......... 219/494, 497, 501, 492, 533, 535, 110
See application file for complete search history.

(56) References Cited

U.S. PATENT DOCUMENTS

| 4,642,154 A | 2/1987 | Thalmann et al. |
| 4,684,789 A | 8/1987 | Eggleston |

(Continued)

FOREIGN PATENT DOCUMENTS

| DE | 195 45 317 A1 | 12/1995 |
| EP | 0 335 010 | 10/1989 |

(Continued)

OTHER PUBLICATIONS

Plastics pipes and fittings—Equipment for fusion jointing polyethylene systems—Part 2: Electrofusion, International Standard, ISO First edition May 15, 2000, pp. i-iv, 1-18.

*Primary Examiner* — Brian Jennison
(74) *Attorney, Agent, or Firm* — Hahn Loeser & Parks, LLP (57) ABSTRACT

A method to optimize the welding energy input into the heating coil of a heating coil fitting is disclosed. In particular, the invention pertains to a compensation method for the effects on the welding energy input from using a fundamental frequency outside the tolerance range for the AC welding voltage established for the heating coil fitting. A generator is one option to supply power to a device for the implementation of the invention-based method. It supplies an AC welding voltage to the heating coil with a fundamental frequency outside the tolerance range for the AC welding voltage as marked out for the heating coil fitting. Another option is especially the use of DC welding voltage for the heating coils of heating coil fittings. To execute the method, a welding power supply unit is connected to the contact elements of a heating coil fitting via connecting leads and connecting elements. The electrical parameters for the heating coil fitting are determined, especially the heating coil inductance of the heating coil. Based on the established effective AC welding voltage, a suitable welding voltage and welding time are then determined.

24 Claims, 3 Drawing Sheets

(56) References Cited

U.S. PATENT DOCUMENTS

| | | | |
|---|---|---|---|
| 4,837,424 A | | 6/1989 | Nussbaum et al. |
| 4,851,635 A | * | 7/1989 | Farrow ........................ 219/110 |
| 4,978,837 A | | 12/1990 | Eggleston |
| 5,130,518 A | * | 7/1992 | Merle ......................... 219/497 |
| 5,138,136 A | | 8/1992 | Moreau et al. |
| 5,951,902 A | | 9/1999 | Goodman et al. |
| 6,313,449 B1 | | 11/2001 | Smith et al. |

FOREIGN PATENT DOCUMENTS

| | | |
|---|---|---|
| EP | 0 437 149 | 7/1991 |
| EP | 1 022 114 | 7/2000 |
| GB | 2 091 428 | 7/1982 |
| WO | WO 82/02593 | 8/1982 |
| WO | WO 97/20682 | 6/1997 |

\* cited by examiner

COMPENSATION FOR INDUCTION HEATING IN COIL WELDING EQUIPMENT

CROSS-REFERENCE TO RELATED APPLICATIONS/INCORPORATION BY REFERENCE

This patent application is a national stage entry into the United States of PCT application EP2004/009548, which was filed on 26 Aug. 2004, which claims priority to German application 103 40 206.3-24, dated 1 Sep. 2003.

TECHNICAL FIELD

The present invention pertains to a procedure to optimize the welding energy input into the heating coils of a heating coil fitting. The present invention also pertains to a heating coil welding apparatus, which particularly suits the above-mentioned procedure.

BACKGROUND OF THE INVENTION

Aside from heating element-stud welding techniques, professionals in the field use mostly heating coil welding to tightly join plastic components. In heating coil welding, heating coil fittings, also known as heating coil bushings, are used to axially join pipes or tubes, such as utility pipes for water or gas. For the welding process, heating coil fittings feature a synthetic pipe fitting, for example, made from polyethylene, with at least one exposed or concealed heating coil on or in the tube wall. The heating coil has two terminal contacts, which extend to the outside and may be connected with an electric welding power supply.

The two synthetic workpiece pipes are first inserted in a fitting tube with a slightly larger bore than the outer diameter of the workpiece pipes to be welded together. A welding voltage is then applied to the heating coil, a current passes through the heating coil and the so applied energy is transformed into heat in the electrical or ohmic resistance of the heating coil. Starting at the heating coil, the heat slowly permeates the synthetic materials of the pipes and fittings. These materials will plasticize and flow together, once they are past the softening point or when they have reached the melting range, respectively. Subsequent cooling yields a permanent homogenous bond between the two pipes and the fitting, which is gas- and waterproof. This entire process is called "heating coil welding" or also "welding".

In an established heating coil welding method with an AC welding voltage feed from the welding power supply to the heating coil, the effective value for the welding voltage is kept constant throughout the welding process. Consequently, the required heat for the welding process is mainly achieved by adjusting the welding voltage and/or the welding time. Modern heating coil welders access the welding parameters via a data feed mechanism to set the welding voltage and time prior to the actual welding process.

In this process, the welding parameters may be imported via bar code. In order to exclude mistakes, the manufacturer may, for example, put a bar code label on each component, making the label a non-detachable, permanent feature of the fitting. This avoids common mistakes, such as input errors for the welding voltage and/or time.

The bar code design is standardized and contains not only the input parameters for the welding process. Providing the welder design accommodates these functions, the bar code also documents reference data for the laying of pipe networks, such as the manufacturer's information for the pipe components, where the pipes may be installed, etc. The bar codes also contain the known temperature compensation data, which the actual welding machine can use to adjust the appropriate welding energy input into the fitting.

In the past, heating coil welders were built either for use with a generator or with a mains adapter with an AC voltage input and output. Power control and consequently, the energy input control for the heating coil fitting, is usually regulated by phase angle control of the 230/50 Hz-voltage from the national grid, which is reduced to low-voltage output using a transformer. To regulate the electrical power input into the heating coil of the fitting at the outlet, the effective output voltage is measured, and via a control unit the phase angle or delay angle $\alpha$ of the phase angle cut-off is set. Idealized, the output signal from these heating coil welders resembles a phase angle controlled sinus wave with the fundamental frequency pulse of the input signal, i.e. 50 Hz in case of the above-mentioned mains voltage and between 40 Hz and 70 Hz for equivalent generator voltages, respectively.

After the allotted phase-out times, the since 1971 valid EU standard EN 61000-3-2 prohibits the use of the technique as described above for equipment with a mains power supply. Aside from other concerns, the standard is meant to especially restrict the feed of harmonic waves into the public low-voltage grid. The standards impose limit values for the impact on the public grid, such as for the phase shift between current and voltage due to inductive or capacitive loads, and harmonic waves due to the above-mentioned phase angle control. EN 61000-3-2 is equivalent to the German national standard, VDE 0838 "Electromagnetic Compatibility Limits for Harmonic Currents".

The manufacturers of voltage or power supply devices have therefore stepped up the development of suitable voltage converter technologies. Power factor controllers (PFCs) are one solution to keep harmonic waves under the maximum value as set by the European standard EN 61000-3-2. In principle, there are two approaches, i.e. passive and active PFC. Passive PFC is based on the inductance in the user input circuit to temporarily store power from the grid, thus dampening power spikes. In active PFC, a device-integrated electronic control unit constantly monitors the user's power demand. Needed power is taken from the grid in almost perfect sinus configuration and temporarily stored. For their input circuits, these high-frequency voltage converters feature a $\cos(\phi)$ very close to 1 and a rather small harmonic interference. The output from these units is DC voltage.

The use of DC voltage entails certain problems for implementations in the field of heating coil welding. Usually, the heating element for the fitting has the form of a coil and consequently, dependent on the coil geometry, the heating coil has an inductance. Since the prevailing heating coil welders work with an AC welding voltage, currently marketed heating coil fittings are indirectly designed and tested for use with AC welding voltage (50-60 Hz+/−15%) and the above-mentioned phase angle power control (phase angle cut-off). Therefore, the barcode of a fitting contains the effective welding voltage as a crucial parameter for welding operations with AC voltage in a defined frequency range.

The effective power $P_{W,eff}$ that is converted into heat in the heating coil fitting, i.e. the actual heat output or welding output to the heating coil, is calculated according to the following formula:

$$P_{w,eff} = U_{eff} \cdot I_{eff} \cdot \cos\varphi = \frac{U_{eff}^2}{\sqrt{R^2 + (2\pi fL)^2}} \cos(\arctan(2\pi fL/R))$$

$U_{eff}$—effective value for the voltage on the heating coil fitting, $I_{eff}$—effective value of the current through the heating coil fitting, R—ohmic resistance of the heating coil fitting, and L—inductance of the heating coil of the heating coil fitting Due to its inductance L and in combination with its ohmic resistance R, the heating coil of the heating coil fitting constitutes a complex load R+i·2πfL, which causes a phase shift between current and voltage. The ratio of the heating coil reactance 2πfL and ohmic resistance R equals the tangent of the phase angle φ between current I and voltage U.

The formula above indicates that, given equal effective values for the DC and AC welding voltages on the fitting, the effective value for the active welding voltage in the heating coil fitting is always larger for DC voltage with a frequency of f=0 Hz than it is for the operation with AC welding voltage. It is equally apparent that the effective DC welding voltage decreases with increasing fundamental frequencies of the DC voltage.

Accordingly, the general formula for the welding power in the heating coil is:

$$P_{w,eff} = f(U,R,L)$$

When the effective AC welding voltage is regulated via phase angle α of the phase angle control, the creation of harmonics must also be considered. Phase angle control leads to harmonics with frequencies that are usually multiples of the fundamental frequency. Therefore, the total welding power input into the heating coil consists of variable contributions from the fundamental wave and the harmonics. The higher the frequencies of the fundamental wave, the smaller are the amplitudes for the harmonics. In addition, the effect of the inductance L increases with increasing frequency. Increasing frequencies also reduce the harmonic current and with it the welding power contribution of the harmonic waves. The following formula for the heat output from the heating coil is slightly more precise:

$$P_{w,eff} = f(U(\alpha),R,L)$$

It must be noted that the voltage from the grid or from a generator, respectively, itself normally shows some variation. The phase angle α for the phase angle control of the desired effective DC welding voltage is therefore also not constant. This also subjects the welding power contribution from harmonics to deviations.

Finally, the ohmic resistance of the heating coil is temperature-dependent, i.e. the ohmic resistance of the heating coil increases with increasing temperature. In conclusion, the general formula for the effective welding power is therefore substitute specification $$P_{w,eff} = f(U(\alpha),R(T),L)$$

where T stands for the temperature.

Test series have been run either with DC welding voltage or with AC welding voltage, in which the fundamental frequency clearly deviated from the fundamental frequency of the established DC welding voltage for the heating coil fitting. Experiments were done with DC voltages, which were equivalent to the effective AC welding voltage according to the barcode label on the fitting. The results revealed differences in actual welding power at the heating coil fitting of up to 50% for the worst case, particularly for pipes with large diameters.

In other words: When a heating coil fitting is designed for use with AC voltage and the established effective AC welding voltage $U_{eff}$ in the barcode of the heating coil fitting is applied, then an equivalent DC welding voltage may deliver by 50% too much heat to the heating coil fitting. However, deviations larger than 5% can already compromise the quality of the welded joint. In experiments, this led to an overheating of the synthetic material and even to the collapse of pipes with thin walls. This condition is intolerable, especially for gas pipes with their high safety requirements.

Conversely, the welding energy input was decidedly lower when the fundamental frequency was higher than the frequency of the established DC welding voltage according to the fitting label. As a consequence, the welding process is executed with less than the predetermined welding energy input. This can be even more detrimental than the above-mentioned overheating of the welding spot because the inferior weld due to the less than optimal welding energy input may escape notice.

While the set time limits according to EN 61000-3-2 run out, an obvious and safe course of action would be to phase out all outdated heating coil welding equipment for use with AC voltage from the national grid and replace it with heating coil welding equipment that is designed for DC voltage input. For safety reasons, the use of fittings, which are not designed for use with DC welding voltage, should then also be prohibited. According to this scheme, the outdated heating coil fittings would have to either be discarded or returned to the manufacturer to be fitted with a new barcode. This would incur considerable costs.

In the global market for the heating coil welding technology, in the area of generator-supplied heating coil welders, as used in the exempt construction business, for example, there are however implementations, in which the supply voltage has a frequency of 200 Hz or higher. As a matter of principle, the use of fittings, which are not designed for such frequencies, would have to be prohibited too. However, this market is too small to offer small lots of heating coil fittings for such high fundamental frequencies, complete with labeling for the welding voltages and times—and then offer the fittings at the usual market prices for regular fittings.

Further limitations and disadvantages of conventional, traditional, and proposed approaches will become apparent to one of skill in the art, through comparison of such systems and methods with the present invention as set forth in the remainder of the present application with reference to the drawings.

SUMMARY OF THE INVENTION

It is therefore in accordance with embodiments of the present invention to create procedures and a device for the determination of precise welding voltage settings for heating coils and thus achieve an optimized welding energy input when the fundamental frequencies of the AC welding voltages for the heating coil fittings are outside the established tolerance zone, especially for DC welding voltages.

The invention-based procedures to optimize the welding energy input into the heating coil of a heating coil fitting are realized using a welding power supply unit, which can be connected via connecting leads and connecting elements to the contact elements of the heating coil fitting. In this arrangement, at least the value for the effective AC welding voltage with a fundamental frequency within a set tolerance range and the corresponding welding time are known. These welding parameters may be accessible as barcode information on the heating coil label.

After the welding power supply unit and the heating coil fitting have been connected, the application of a welding voltage to the contacts of the welding coil fitting will start the actual welding process. However, according to the present invention, a welding voltage with an arbitrary fundamental frequency may be used, i.e., significant frequency deviations are permitted in comparison with the frequency tolerance of the established welding voltage for the welding fitting.

DC voltage is used as welding voltage in a first embodiment of the present invention. This invention-based DC heating coil welder is best used with a mains power supply because the above-described negative impact on the grid is as good as non-existent.

In a second embodiment of the invention, the welding voltage may be an AC voltage with a fundamental frequency outside the tolerance range for the established AC welding voltage for the heating coil fitting. This AC voltage heating coil welder is particularly well suited for use with a generator as power supply for AC voltage, for example with a frequency of 200 or 400 Hz, e.g. for the exempt use on construction sites.

It should be mentioned, that another design might make a heating coil welder suitable for both above-mentioned implementations, i.e. in the first or second embodiment and as an all-purpose heating coil welder.

In either embodiment and for the all-purpose heating coil welder, at least one or several electrical parameters for the heating coil fitting are determined for the implementation of the present invention. To ascertain optimized energy input into the heating coil fitting, at least one parameter or several electrical parameters for the heating coil fitting are then used to determine a correction factor for the energy input. The correction factor is then used to adapt at least one welding parameter.

Two welding parameters may be set, either the effective welding voltage or the welding time, i.e. the duration for which the welding voltage is applied to the heating coil fitting. Of course, it is possible to adjust both parameters. It should be emphasized that the welding parameter(s) are adjusted individually for each welding process. Based on the electrical parameters for each heating coil fitting, the energy input is therefore optimized for each welding process. This obviates the initially mentioned problems without spending additional time and effort on site and without making the handling and service of the heating coil welder more difficult.

Preferentially, the welding parameter(s) (at least one) for the heating coil fitting are determined before the actual welding process starts, i.e. after the heating coil fitting is attached to the heating coil welder and after entering the established parameters as given on the heating coil fitting. However, it is also conceivable to start the welding process right away and synchronously adjust a parameter, e.g. the welding time.

In the invention-based method, at least the inductance of the heating coil in the heating coil fitting is entered as a first electrical parameter, especially when the attached label on the heating coil fitting shows the ohmic resistance of its heating coil. However, it is also possible to determine the ohmic resistance of the heating coil in the heating coil fitting as an additional, second electrical parameter.

In another embodiment, the ohmic resistance of the heating coil is measured parallel to the welding process, either continuously or in set time intervals. It is a known fact that the ohmic resistance of the heating coil itself changes with the temperature. This temperature dependency has a further, albeit small influence on the welding energy input into the fitting.

For all above-mentioned embodiments of the invention, the correction factor for the energy input is defined by at least one of the following single correction factors, i.e. the correction factor for the energy input may be defined by one single correction factor for one parameter or an arbitrary combination of single correction factors.

In a first aspect of the present invention, the first single correction factor is an inductance correction factor. In essence, this factor accounts for the additional influence on the welding energy input, which stems from the inductance of the heating coil in the heating coil fitting when the fundamental frequency for the welding voltage deviates from the preset tolerance range for the heating coil fitting.

In a second aspect of the present invention, a second single correction factor is a harmonics correction factor. In essence, this factor corrects for the welding energy input, which is due to the harmonic waves of an AC welding voltage when the fundamental frequency for the welding voltage deviates from the preset tolerance range for the heating coil fitting.

In a third aspect of the present invention, a third single correction factor is an ohmic resistance correction factor. In essence, this factor is meant to correct for the impact on the welding energy input, which results from the temperature dependency of the ohmic heating coil resistance in the heating coil fitting.

The fundamental frequency of the established AC welding voltage for a heating coil fitting has a preferred tolerance range of about 40 Hz to 70 Hz.

There are several ways to measure the inductance of the heating coil to determine the electrical parameters for the heating coil in the heating coil fitting, and the expert is familiar with several wiring schemes. Exemplary and not as a final point, it should be mentioned here that the inductance can be determined from the phase angle between current and voltage of an AC voltage measurement signal that is applied to the heating coil fitting. Another method to determine the inductance employs the resonance frequency change in a resonant measurement circuit, which is connected with the heating coil of the heating coil fitting. The inductance can also be determined by measuring the difference in complex heating coil resistance for at least two measurement signals with different frequencies.

In the context of the claim-based compensation for the reactive electrical heating coil attributes of a heating coil fitting, the following should be emphasized: For a heating coil fitting and the fundamental frequency of interest, for which it was originally designed, either the inductance of the heating coil or its reactance at the fundamental frequency can be determined and used to set the correction factor for the inductance.

With regard to the determination of the electrical parameters, the following should be pointed out: The parameters may be determined using separate measurement circuits, which can be connected to the contacts on the heating coil fitting. However, the electrical parameters may also be set via the connecting leads of the welding power supply at the connecting elements of the heating coil fitting.

It should be pointed out that the heating coil welding device offers the same advantages as exemplified above in connection with the procedures.

These and other advantages and novel features of the present invention, as well as details of illustrated embodiments thereof, will be more fully understood from the following description and drawings.

BRIEF DESCRIPTION OF SEVERAL VIEWS OF THE DRAWINGS

In the following, more advantageous embodiments and an example implementation are outlined with illustrations.

DETAILED DESCRIPTION OF THE INVENTION

Figure 1:
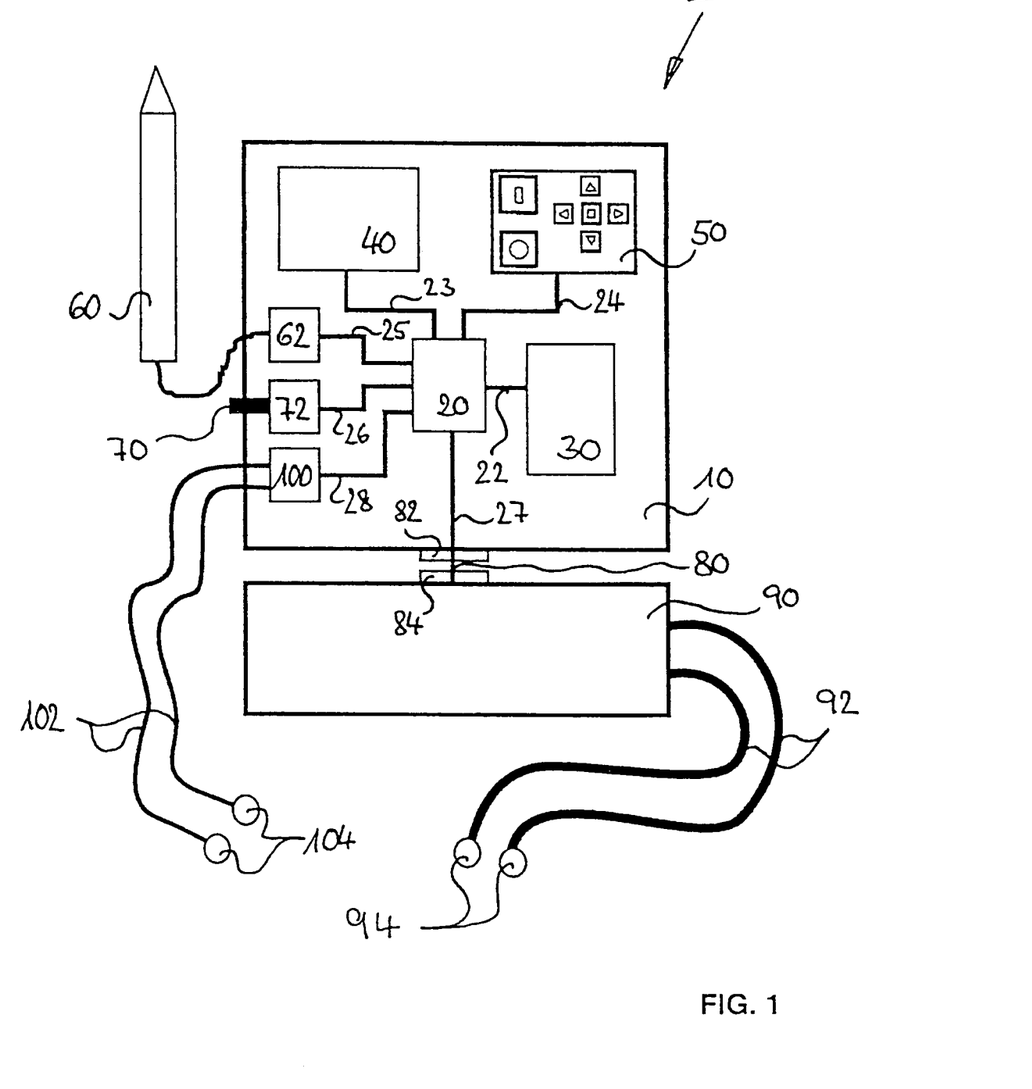
FIG. 1 Diagram of an invention-based heating coil welding apparatus, in accordance with an embodiment of the present invention.

FIG. 1 shows an example embodiment of a connecting unit 1, in particular a heating coil welder with an invention-based control unit 10 for the automatic optimization of the welding energy input into a heating coil fitting. The control unit 10 may be an integral component, or it can be designed as modular auxiliary component for the connecting unit 1.

The control unit 10 features a central control component 20, for instance, a CPU for the determination of the correction factor for the energy input according to the present invention, among other functions. Via the data line 22, the central control component is connected to the storage unit 30, which temporarily stores (buffers) at least one or several electrical welding parameters for a heating coil fitting. Storage unit 30 can also store actual welding data, such as information about the used heating coil fitting or a molded electrical part, respectively. It is also feasible to add protocols and documentation about pipe networks to these storage data.

The central control component 20 is further connected via data line 23 to a display 40, which renders alphanumeric and/or graphic symbols (icons). For example, the graphic and/or alphanumeric display 40 can render part ID information from the central control component 10 and display an already known electrical parameter or a set of already known parameters for a welding part.

Another data line 24 connects the central control component 20 with a console 50 for the manual entry and/or selection of individual device functions.

The central control component 20 is also connected via a data line 25 to a barcode reader 60. A digital transcriber 62 is inserted in data line 25 to turn the bar code reading into digital data. Via the barcode reader 60, the central control component receives data, such as specific data about the heating coil fitting that is about to be processed. The internationally standardized barcode on heating coil fittings contains the data for the effective AC welding voltage and the correct welding time, among other data. Additional barcode information for the temperature compensation is processed by the central control component to adjust the welding conditions for the environmental temperature. For this function, a temperature sensor 70 is connected to the central control component 20 via data line 26, which contains the device 72, here an A/D converter, to turn the data from the temperature sensor into digital data.

Finally, data line 27 forms the connection between the central control component 20 and the port 80. To access the data, the control unit 10 is connected to the welding power supply 90. It should be pointed out that the port 80 might be executed either as hardware or as software design, respectively.

FIG. 1 shows the hardware design version of port 80, which consists of a connector 82 and a socket 84 to connect the two modules, i.e. the control unit 10 and the welding power supply 90. The welding power supply 90 also features connecting leads 92 and the connecting elements 94 for the electrical connection with the contact elements (not shown) of the heating coil fitting (not shown).

To determine the electrical heating coil parameters of the heating coil fitting, the central control component 20 is wired via data line 28 to the measuring device 100. Via measuring line 102 with its contact elements 104 at the ends, the measuring device 100 can be connected to the contact elements of the heating coil fitting. The design features of the measuring device 100 include suitable functions to determine at least the reactance or the inductance and, if necessary, also the ohmic resistance of the heating coil fitting.

Measuring device 100 converts the measured electrical parameters into digital data and supplies them to the central control component 20 for further processing. In this scheme, the connecting unit 1 may be designed to measure the ohmic resistance continuously or in set time intervals. Continuous compensation for the temperature-dependent change in ohmic resistance and the proportionate correction of the energy input during the welding process allow an even more precise regulation of the energy input into the fitting.

Figure 2:
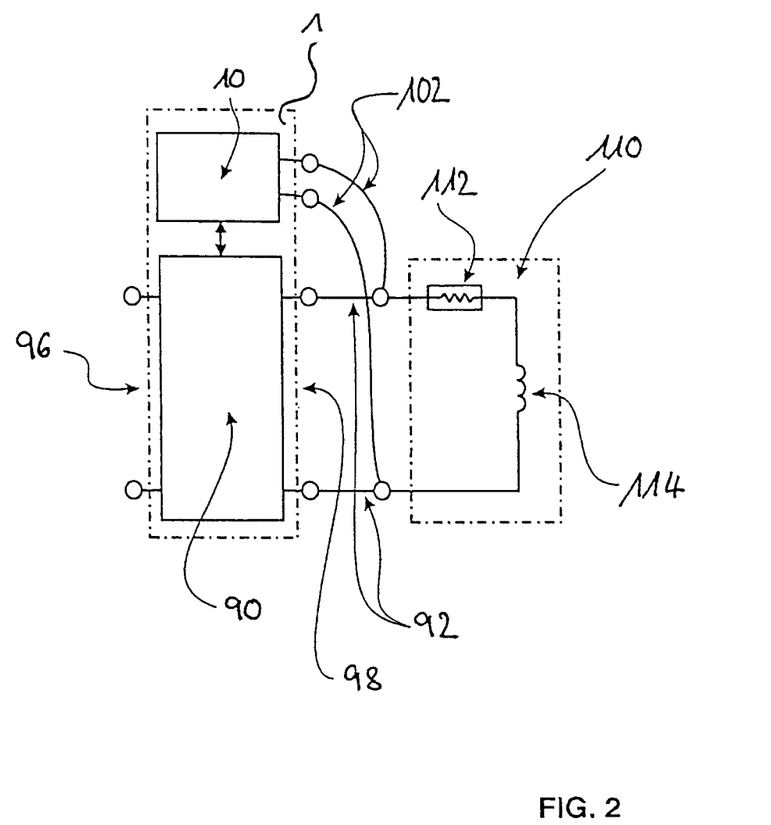
FIG. 2 Equivalent circuit diagram for the heating coil of a heating coil fitting along with a simplified representation of the heating coil welder from FIG. 1.

FIG. 2 shows a simplified diagram of the connecting unit 1 with the control unit 10 and the welding power supply unit 90 from FIG. 1. The welding power supply unit 90 is connected to the heating coil fitting 110 via connecting leads 92. The equivalent electrical circuit diagram with an ohmic resistance 112 and the inductance 114 depicts the heating coil of the heating coil fitting 110. Via measuring lines 102, the control unit 10 is also connected with the contact elements of the heating coil fitting 110. The welding power supply unit 90 also features contacts 96 for the connection to the energy grid (mains). This mains-supplied version of the connecting unit 1 works with an AC voltage of 220/230 V and 50-60 Hz. The mains grid-independent version of the connecting unit 1 is powered by a generator with an AC voltage output of defined amplitude and a frequency, which may deviate from the regular mains frequency.

The welding power supply unit 90, preferably the mains-connected version, provides at its output 98 the required DC welding voltage to produce the welding energy for the heating coil fitting. The welding energy is released by the heating coil in the form of heat.

Figure 3:
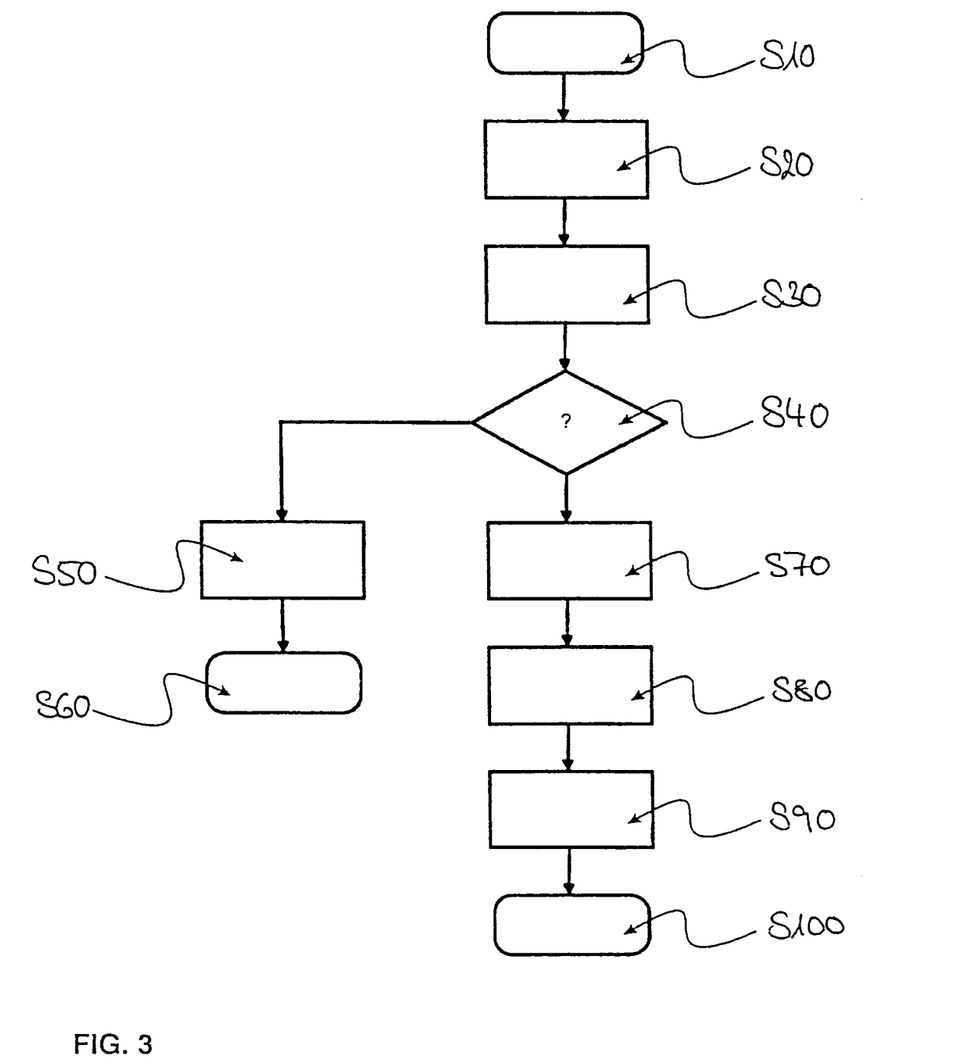
FIG. 3 Flow diagram depicting the individual procedural steps in the regulation of the welding energy input into a heating coil fitting, in accordance with an embodiment of the present invention.

Welding power supply units for use in exempt applications may also be designed for the output of an AC welding voltage. In this case, the frequency deviation from the marked out fundamental frequency on the heating coil fitting has effects on the welding energy input into the heating coil. These effects are counteracted and thus the aforementioned advantages are realized In closing, FIG. 3 shows a flow diagram, which outlines for the invention-based method the procedural steps for the proper regulation of the welding energy input into the heating coil fitting in heating coil welding.

It should be pointed out that the flow diagram only depicts those steps, which specifically relate to the optimization of the welding energy. In particular, the steps relate to the necessary invention-based correction(s) of one or several welding parameters. This takes into account one or several of the following aspects, 1. the influence due to the inductance of the heating coil on the energy input into the heating coil fitting, 2. the portion of the energy input due to harmonics for a phase angle controlled AC welding voltage, and/or 3. the impact on the energy input due to the temperature-dependency of the ohmic heating coil resistance in the heating coil fitting.

The method starts with step S10. The assumption is made that at this time the pipes to be welded together are already put end-to-end, still detachable, inside the heating coil fitting and that all necessary cables, i.e. the leads to the power supply and the measuring lines, are connected to the heating coil fitting.

In step S20, the information from the barcode on the heating coil fitting, especially the manufacturer-supplied welding parameters, such as the effective AC welding voltage and the welding time, are first entered via the barcode reader (see FIG. 1) into the central control component of the control unit.

Following step S20, in step S30 the electrical heating coil parameters for the heating coil fitting are determined, in particular the ohmic resistance and the inductance, using the measuring devices in the control unit and the measuring lines to the heating coil fitting.

In step S40 plausibility and error checks take place. For this purpose, the measured ohmic resistance may be compared to the prior established value from the barcode, for instance. A value outside a predetermined tolerance range may point to a faulty cable or corroded connection elements, in which case the procedure advances to step S50. In step S50 the display of the control unit shows the appropriate diagnosis or an error message for the user. In the following step S60, the procedures are terminated, i.e. the welding process does not start.

When the plausibility and error checks are passed without irregularities, the procedures continue with step S70. In accordance with the present invention, in step S70 the central control component derives the energy input correction factor from the measured electrical parameters for the heating coil and the barcode data.

In case a DC voltage is used as welding voltage, the energy input correction factor takes into account that there is no phase shift between welding current and welding voltage due to the inductance of the heating coil, and therefore there is no reactive power. Consequently, for use with DC welding voltage the actual working voltage must be lower than the effective AC welding voltage or alternatively, the welding time must be shortened. Of course, a combination of both measures can be applied.

The energy input correction factor further takes into account that for a DC welding voltage there is no contribution to the energy input into the heating coil fitting from harmonic waves. Finally, the ohmic resistance of the heating coil in the heating coil fitting is continuously measured and the temperature-dependency of the ohmic resistance is factored in. It should also be noted that the contributions to the energy input correction factor as a result of harmonic waves or the temperature-dependency of the ohmic resistance of the heating coil, respectively, can also be empirically determined from a series of measurements. These empirical data can be stored as constants or tables in the program of the central control component of the connecting device.

For implementations using an AC welding voltage with a fundamental frequency outside the tolerance range for the established AC welding voltage, preferentially using a higher actual frequency, e.g. a fundamental frequency of 200 Hz, the energy input correction factor takes into account the following condition: The frequency-dependent inductive reactance of the heating coil leads to a modified phase shift between welding current and welding voltage. This changes the reactive power in the heating coil fitting. In this case, the actual effective working voltage must be higher than the marked out effective AC welding voltage on the barcode label of the fitting. Alternatively, the welding time can be extended. Of course, a combination of both measures also works.

In this case, the energy input into the heating coil fitting due to harmonic waves has also changed. The energy input correction factor accounts for this effect too. Finally, the ohmic resistance of the heating coil is measured continuously in this case as well, and the temperature-dependency of the ohmic resistance is factored in. It should be noted here as well, that contributions to the energy input—either as a result of harmonic waves or due to the temperature-dependent changes of the ohmic heating coil resistance—can also be empirically determined from a series of measurements. The empirical data can be stored as constants or tables in the program of the central control component in the connecting device.

In step S80, after putting the energy input correction factor into the calculations, the central control component sets the corrected welding voltage or the corrected welding time. Subsequently, in step S90, the actual welding process starts. During the welding process, the control unit monitors the welding parameters and adjusts them as needed.

Step S100 ends the procedure after the specified welding time. The weld is then allowed to cool for a specified time. In an added step, the control unit may also monitor the cooling process.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. A method to optimize a welding energy input into a heating coil of a heating coil fitting involving a welding power supply, said method comprising:
   receiving a corresponding welding time and an effective value of an AC welding voltage with a defined fundamental frequency, for which the heating coil fitting was originally designed;
   connecting the welding power supply to contact elements and connecting elements of a heating coil fitting via connecting leads and connecting elements;
   measuring at least one electrical parameter of the heating coil fitting wherein an inductance of the heating coil of the heating coil fitting is measured as a first electrical parameter;
   determining, at least from the measured first electrical parameter of the heating coil fitting, at least a first energy input correction factor being an inductance correction factor provided to take into account an influence of the heating coil inductance of the heating coil fitting on the welding energy input in case of a deviation from a tolerance range for a fundamental frequency of an established AC welding voltage for which the heating coil fitting was originally designed; and
   optimizing a welding energy input into the heating coil fitting using at least the first energy input correction factor to adjust one or several welding parameters, respectively.

2. The method of claim 1, wherein the welding power supply provides the heating coil fitting with a DC welding voltage.

3. The method of claim 1, wherein the welding power supply provides the heating coil fitting with an AC welding voltage, which has a fundamental frequency outside a tolerance range for a fundamental frequency of an established AC welding voltage for which the heating coil fitting was originally designed.

4. The method of claim 1, wherein the energy input correction factor comprises at least one harmonics correction factor, which is designed to take into account a difference in welding energy input due to harmonics of an AC welding voltage in case of a deviation from a tolerance range for a fundamental frequency of an established AC welding voltage for the heating coil fitting.

5. The method of claim 1, wherein the energy input correction factor comprises at least one resistance correction factor, which is designed to correct for an impact on the welding energy input due to a temperature dependency of an ohmic resistance of the heating coil in the heating coil fitting.

6. The method of claim 1, wherein at least one parameter or several electrical parameters, respectively, for the heating coil fitting are measured before the welding process.

7. The method of claim 1, wherein at least one parameter or several electrical parameters, respectively, for the heating coil fitting are measured during the welding process.

8. The method of claim 7, wherein at least one parameter or several parameters, respectively, for the heating coil fitting are measured during the welding process either continuously or in defined time intervals.

9. The method of claim 1, wherein an ohmic resistance is measured as a second electrical parameter for the heating coil of the heating coil fitting.

10. The method of claim 1, wherein an established welding time as a welding parameter is adjusted by means of the energy input correction factor for each individual welding process.

11. The method of claim 1, wherein using the energy input correction factor and a known effective value for an AC welding voltage, the effective AC welding voltage for an AC welding voltage with a fundamental frequency, which is different from a fundamental frequency of an established AC welding voltage, or for a DC welding voltage, respectively, as a welding parameter is adjusted for each individual welding process.

12. The method of claim 1, wherein there is a tolerance range of about 25 Hz to 75 Hz for a fundamental frequency of an AC welding voltage that is established for the heating coil fitting.

13. The method of claim 1, wherein the inductance of the heating coil is determined using a phase angle between a current and a voltage of an AC measurement signal, which is applied to the heating coil fitting.

14. The method of claim 1, wherein the inductance is measured via a change in a resonant frequency in a resonant measurement circuit connected to the heating coil of the heating coil fitting.

15. The method of claim 1, wherein the inductance is determined using a change in complex heating coil resistance of the heating coil fitting for at least two measurement signals with different frequencies.

16. The method of claim 1, wherein the electrical parameters are measured via separate measurement lines, which can be connected to the contact elements of the heating coil fitting.

17. The method of claim 1, wherein the electrical parameters are measured via the connecting leads of the welding power supply at the contact elements of the heating coil fitting.

18. A heating coil welding unit, said heating coil welding unit comprising:
at least one welding power supply;
at least two connecting lines which are connected to the welding power supply, the connecting lines each having a connecting element and being detachably connectable via the welding power supply to contact elements of a heating coil of a heating coil fitting;
a control unit operationally connected to said welding power supply and comprising at least one central control component;
at least one input device operationally connected to said central control component to input established welding parameters into said control unit, wherein the established welding parameters comprise a corresponding welding time and an effective value of an AC welding voltage with a defined fundamental frequency, for which the heating coil fitting was originally designed;
wherein the central control component is operationally connected with at least one device to measure at least one electrical heating coil parameter of the heating coil fitting, wherein a heating coil inductance is measured as a first electrical parameter for the heating coil fitting, and wherein the central control component is configured to
determine, at least from the measured first electrical parameter, at least a first energy input correction factor being an inductance correction factor provided to take into account an influence of the heating coil inductance of the heating coil fitting on the welding energy input in case of a deviation from a tolerance range for a fundamental frequency of an established AC welding voltage for which the heating coil fitting was originally designed,
adjust one or several welding parameters, respectively, by means of at least the first energy input correction factor, thus optimizing a welding energy input into the heating coil fitting.

19. The heating coil welding unit of claim 18, wherein a second electrical parameter comprises an ohmic heating coil resistance for the heating coil fitting.

20. The heating coil welding unit of claim 18, wherein at least one of the one or several welding parameters to be adjusted is either an effective AC welding voltage, a DC voltage, or a welding time.

21. The heating coil welding unit of claim 18, wherein the established welding parameters are read from a label on the heating coil fitting.

22. The heating coil welding unit of claim 21, wherein the established welding parameters are provided as barcode on the label of the heating coil fitting and, therefore, a device to read and input at least the welding parameters into the central control component is a barcode reader.

23. The heating coil welding unit of claim 18, wherein the welding voltage is a DC voltage.

24. The heating coil welding unit of claim 18, wherein the welding voltage is an AC voltage with a fundamental frequency, which differs from a fundamental frequency of the established AC welding voltage for which the heating coil fitting was originally designed.

* * * * *

UNITED STATES PATENT AND TRADEMARK OFFICE
CERTIFICATE OF CORRECTION

| | |
|---|---|
| PATENT NO. | : 8,653,424 B2 |
| APPLICATION NO. | : 10/569849 |
| DATED | : February 18, 2014 |
| INVENTOR(S) | : Bernd Merle et al. |

It is certified that error appears in the above-identified patent and that said Letters Patent is hereby corrected as shown below:

In the Specification:

Column 3; Line 57: delete "substitute specification"

Signed and Sealed this
Twentieth Day of May, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,653,424 B2  Page 1 of 1
APPLICATION NO. : 10/569849
DATED : February 18, 2014
INVENTOR(S) : Merle et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2150 days.

Signed and Sealed this

Twenty-ninth Day of September, 2015

Michelle K. Lee
*Director of the United States Patent and Trademark Office*